United States Patent [19]

van der Broeck et al.

[11] Patent Number: 5,079,924
[45] Date of Patent: Jan. 14, 1992

[54] CIRCUIT FOR CONTROLLING A FREE-PISTON ENGINE IN PARTICULAR OF A REFRIGERATOR COMPRESSOR

[75] Inventors: Heinz van der Broeck, Zülpich. Fed. Rep. of Germany; Enrico Vasconi, Varano Borghi, Italy

[73] Assignee: Whirlpool International B.V., Veldhoven, Netherlands

[21] Appl. No.: 613,345

[22] Filed: Nov. 13, 1990

[30] Foreign Application Priority Data

Nov. 17, 1989 [IT] Italy .................. 22422 A/89

[51] Int. Cl.⁵ .............................. F25B 9/00
[52] U.S. Cl. .............................. 62/6; 60/520; 62/230
[58] Field of Search ............ 62/6, 230; 60/520; 318/126

[56] References Cited

U.S. PATENT DOCUMENTS

| | | | |
|---|---|---|---|
| 4,567,726 | 2/1986 | Vitale et al. | 62/6 X |
| 4,902,952 | 2/1990 | Lavery | 62/6 X |
| 5,018,357 | 5/1991 | Livingstone et al. | 62/6 X |

FOREIGN PATENT DOCUMENTS 0266835 5/1988 European Pat. Off. .

Primary Examiner—William E. Wayner
Attorney, Agent, or Firm—Bernard Franzblau

[57] ABSTRACT

A circuit for controlling a free-piston engine, particularly of a refrigerator compressor, includes a bridge circuit part (1) of H configuration, in the sides (4, 5, 6, 7) of which there are positioned electronically controlled switching elements (8). The part of H configuration (1) is connected to an engine (10). A microprocessor (17) is provided to control the opening and closure of the electronic switching elements in accordance with the measurement of the mains power absorbed by the engine. The circuit provides elements (23, 25) for measuring the absorbed mains current traversing the diagonals (4, 7; 5, 6) of the H part (1), said current being proportional to the mains power absorbed by the engine (10). The elements (25) feeds a signal to the microprocessor which, on the basis of this signal, generates a further signal which, by comparison with a value equal to the current actually absorbed by the engine, enables the electronic switching elements (8) to be controlled.

11 Claims, 1 Drawing Sheet

CIRCUIT FOR CONTROLLING A FREE-PISTON ENGINE IN PARTICULAR OF A REFRIGERATOR COMPRESSOR

BACKGROUND OF THE INVENTION

This invention relates to a circuit for controlling a free-piston engine, in particular of a refrigerator compressor.

As is well known, a free-piston engine of a compressor has to be fed with alternating (sinusoidal) current of variable amplitude and frequency.

It is also known that the power generated by the engine as a function of parameters, such as the temperature and humidity of the environment in which the refrigerator is located, has to be varied as said parameters vary.

Generally, the amplitude of the feed current is fixed for certain particular values of said parameters, whereas the frequency of this current is varied, by discrete values, until the frequency at which the mains power absorbed by the engine and therefore the power generated by the engine are a maximum.

Various circuits have already been proposed for monitoring and controlling the feed to an engine of the said type, which in particular enable the frequency of said feed to be varied in accordance with the variation in the environmental parameters of the place in which the refrigerator is located.

A known control circuit of the aforesaid type is described in EP 0 266 835 and comprises a circuit part of H configuration (or H bridge) to which the free-piston engine is connected and from which a current having a value proportional to the current absorbed by the engine is led off. At the same time, a voltage signal taken from a parallel-connected transformer is fed to a multiplier, for example, of the four-quadrant type, to which the said current signal is also fed. An analogous current signal is fed to a differential amplifier.

The multiplier provides an output an signal representing the product of the current and voltage signals, this signal therefore representing the power generated by the engine.

This power signal, after suitable filtration, is fed to a microprocessor which, using a, preset program, evaluates whether the determined power is the optimum or not.

Based on this determination, the microprocessor generates a current signal which is used a reference in the differential amplifier.

This latter provides an output a signal which is used to control the opening and closure of electronic switches connected into the sides of the H bridge, in order to allow passage of the engine feed current across the diagonals of these sides.

The known circuits have various drawbacks.

In particular, circuits using multipliers do not have high operational reliability and are often subject to faults, the repair of which involves high cost.

In addition, such circuits are costly to construct, reflecting the cost of the components used.

SUMMARY OF THE INVENTION

An object of the present invention is therefore to provide a circuit for controlling a free-piston engine which offers high operational reliability, is of low constructional cost and uses components which are simpler than those used in analogous circuits of the prior art.

This and further objects, which will be apparent to the person of ordinary skill in the art, are attained by a circuit for controlling a free-piston engine, particularly of a refrigerator compressor, comprising a bridge circuit, i.e. a part of H configuration, in the sides (arms) of which there are positioned electronically controlled switching means, said part of H configuration being connected to said engine. A microprocessor is provided to control the opening and closing of said electronic switching means in accordance with the measurement of the mains power absorbed by the engine. The circuit is characterised in that it provides a means for measuring the absorbed mains current traversing the diagonals of the H part, said current being proportional to the mains power absorbed by the engine, said measuring means feeding a signal to the microprocessor circuit which, on the basis of this signal, generates a further signal which, by comparison with a signal value equal to the current actually absorbed by the engine, enables the electronic switching means to be controlled.

BRIEF DESCRIPTION OF THE DRAWING

The advantages and features of the present invention will be more apparent from the accompanying drawing, which is provided by way of non-limiting example, when taken in conjunction with the following description and in which.

DESCRIPTION OF THE PREFERRED EMBODIMENTS

Figure 1:
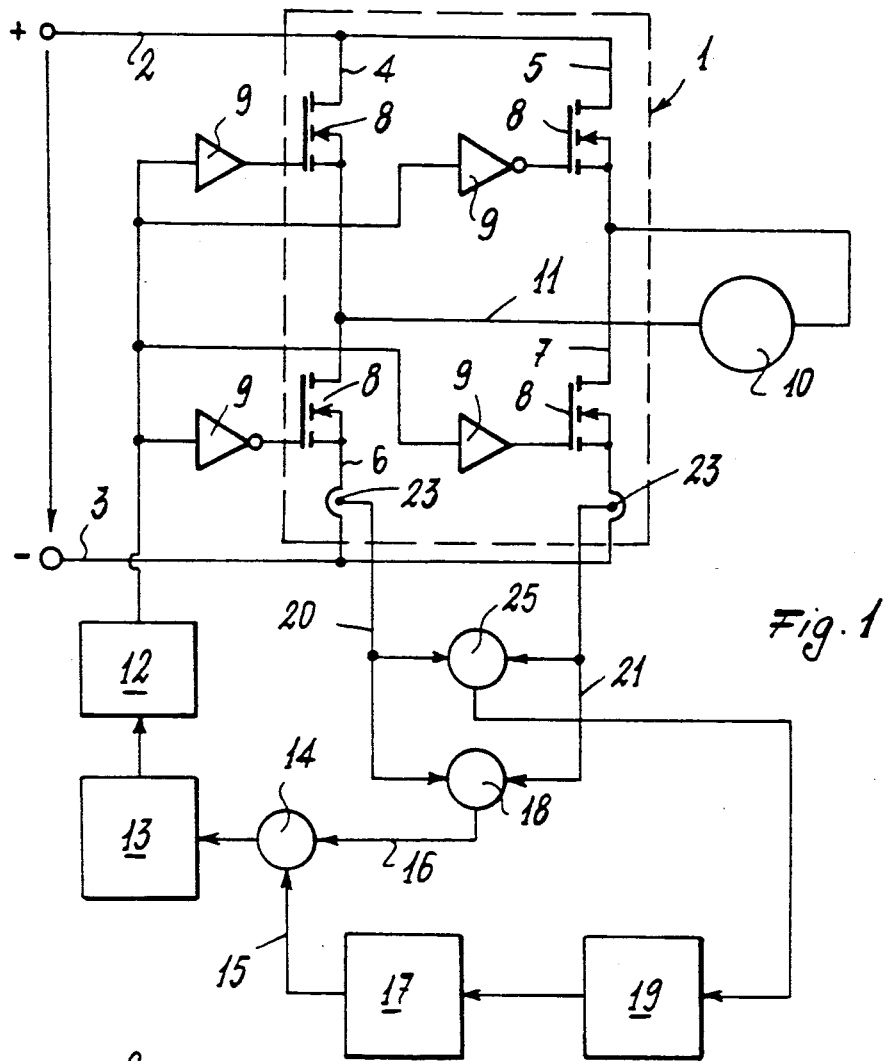
FIG. 1 is a block diagram of a circuit formed in accordance with the invention.

With reference to FIG. 1, the control circuit of the invention comprises a circuit part 1 of H configuration connected to the mains via feed and return lines 2 and 3. In the sides of the circuit part 1 there are positioned power MOSFETS operated by the usual control circuits 9. The circuits 9 represent static switches working in opposition. Specifically, the MOSFETS 8 on the sides 5 and 6 are connected to inverting buffer circuits 9, whereas the MOSFETS on the sides 4 and 7 are connected to non-inverting buffer circuits 9.

A free-piston engine 10 is connected to the circuit part 1. This engine, of known type and therefore shown only schematically, is connected to the conductor 11 of the circuit part 1 and to the conductor 7 of this circuit, i.e. the diagonal output terminals of the bridge circuit 4-8. The circuits 9 are connected to a pulse-width modulator 12, which is of a known type generating a pulse-width modulated output signal, the frequency of which is considerably greater than the desired engine drive current frequency.

The modulator 12 is connected to a control circuit 13 of known type, such as a conventional error amplifier circuit. This latter circuit is connected to a differential amplifier 14 which receives signals from a microprocessor 17 and from a further differential amplifier 18 via respective lines 15 and 16. The microprocessor 17, the operation of which is of known type, is also connected to a conventional low pass filter 19. Finally, the amplifier 18 is connected via the lines 20 and 21 to two sensors 23 for determining the current flowing alternately through the two diagonals of the circuit part 1, these diagonals being composed of the lines 4, 11 and 7, and the lines 5, 11 and 6.

According to the invention, a circuit part 25, acting as an adder, is connected to said lines 20 and 21. This circuit part is shown in greater detail in FIG. 2.

Figure 2:
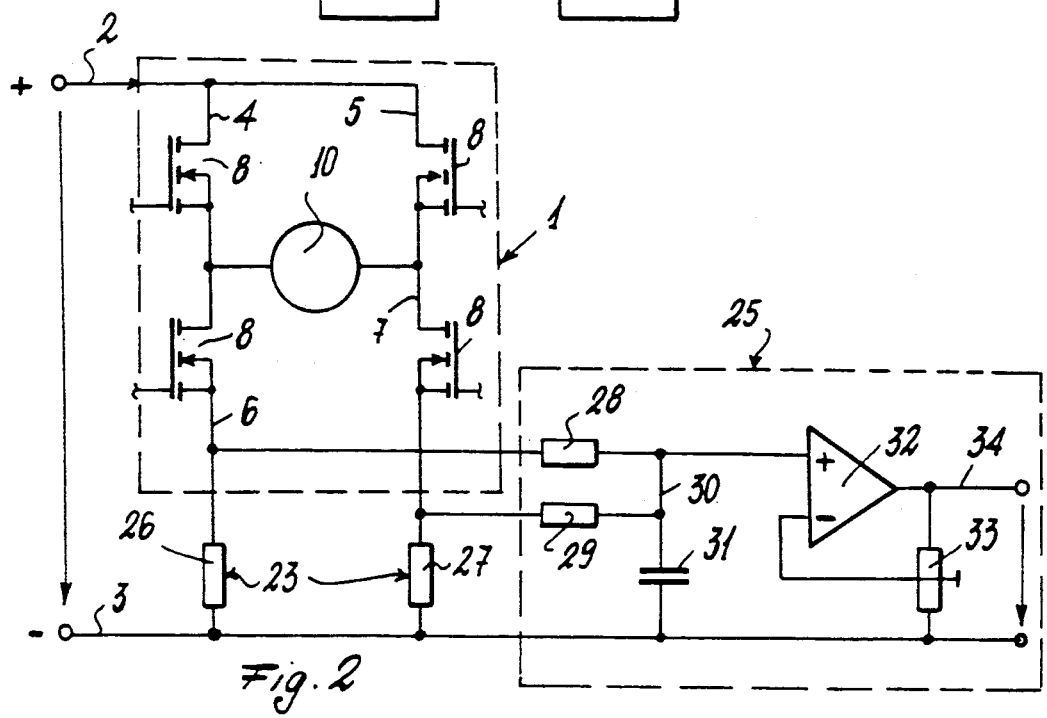
FIG. 2 is an electrical schematic of a part of the circuit of FIG. 1.

In said FIG. 2, parts corresponding to those of FIG. 1 are indicated by the same reference numerals.

In the FIGURES under examination the current sensors 23 are shunt resistors 26 and 27, the adder function of the circuit part 25 and the filter function of the filter 19 of FIG. 1 being permformed by resistors 28 and 29 connected to the sides 6 and 7 of the circuit part 1, respectively. These resistors are also connected to a line 30 terminating in a terminal of a capacitor 31, also connected to the return line 3.

The non-inverting input of an amplifier 32 is connected to the line 30, and its inverting input is connected to a trimmer resistor 33 connected to the output 34 of said amplifier and to the return line 3.

It will now be assumed that the engine 10 is to be operated. For this purpose the circuit is fed (in known manner) with a constant line voltage.

By virtue of the control effected in known manner on the power MOSFETS 8 by the modulator 12 via the circuits 9, these MOSFETS are alternately closed in accordance with a known sequence, such as to cause the line current from the line 2 to circulate through the diagonals of said part 1 alternately.

The sensors 23 determine the current present in the sides 6 and 7 of the part 1. Signals therefore reach the circuit part 25 and the amplifier 18 via the lines 20 and 21 which extend from said sensors.

Specifically, the signals which reach said differential amplifier 18 cause it to generate a sinusoidal signal which is proportional to the current absorbed by the engine 10. The sinusoidal signal is generated by the (algebraic) difference between the current signal circulating in one diagonal of the circuit part 1 and the signal (of opposite sign to the first) generated, during the opening of the MOSFETS positioned in said diagonal, by the usual diodes (not shown) connected in parallel with said MOSFETS.

With regard to the circuit part 25, the signals taken from the shunt resistors are fed to the resistors 28 and 29 and then to the capacitor 31, in order to filter said signals before they are fed to the noninverting input of the amplifier 32.

The amplifier 32 generates an output signal which is proportional to the mains current absorbed by the circuit part 1, its gain over the input being fixed by the trimmer resistor 33. This current is proportional to the power made available to the engine by the mains.

The output signal from the amplifier 32 is then fed to the microprocessor which, in known manner, in accordance with a set program, calculates on the basis of the absorbed current the power made available to the engine by the mains.

The microprocessor then in known manner compares the obtained signal with that stored in a preceding operating sequence. From this comparison the microprocessor determines whether the engine power is optimum, i.e. whether the resonant circuit associated with it operates at resonance frequency in which case it generates an analog frequency signal which is fed to the differential amplifier 14. This signal acts as the input reference signal for the differential amplifier 14.

The differential amplifier 14 compares the signal from the amplifier 18 with said reference signal.

This comparison, i.e. the double check loop (i.e. the check loop for the power absorbed by the engine and that for the current passing through this latter) is effected, as is well known, to prevent the engine from operating under resonant conditions different from those calculated by the microprocessor on the basis of the signal which it receives from the circuit part 25.

Finally, said differential amplifier 14 generates a signal which in known manner is used to control the MOSFETS 8 to enable the engine 10 to absorb from the mains a power equal to the optimum power on the basis of the values of the parameters of the environment external to the refrigerator.

We claim:

1. A circuit for controlling a free-piston engine, comprising; a circuit part of H configuration in the sides of which are positioned electronically controlled switching means, said part of H configuration being connected to said engine, a microprocessor for controlling the opening and closure of said electronic switching means in accordance with the measurement of the mains power absorbed by the engine, means for measuring the absorbed mains current traversing the diagonals of the H circuit part, said current being proportional to the mains power absorbed by the engine, said measuring means feeding a signal to the microprocessor which, on the basis of said signal, generates a further signal which, by comparison with a signal value equal to the current actually absorbed by the engine, enables the electronic switching means to be controlled.

2. A circuit as claimed in claim 1, wherein the means for measuring the absorbed mains current comprise current sensors connected to an adder type circuit.

3. A circuit as claimed in claim 2, wherein the current sensors comprise shunt resistors.

4. A circuit as claimed in claim 2, wherein the adder type circuit part comprises resistors and a capacitor connected to act as a low pass filter.

5. A circuit as claimed in claim 4, wherein the adder type circuit comprises an operational amplifier with feedback to its inverting input via a trimmer element.

6. A power control circuit for a free-piston engine comprising:
   a pair of input terminals for supplying a constant supply voltage to the power control circuit,
   a bridge circuit having input means coupled to said pair of input terminals, at least first and second controlled switching devices, and a pair of diagonal output terminals for connection to said free-piston engine,
   means for measuring the supply current flowing from said pair of input terminals through said diagonal output terminals to a connected free-piston engine, said supply current being proportional to the engine power,
   a first control circuit which receives a signal from the measuring means and which is operative to produce another signal which operates as a reference signal for controlling the switching of said first and second controlled switching devices as a function of the measurement of engine power,
   a comparison circuit having a first input which receives the reference signal and a second input which receives a further signal from the measuring means and which is equal to the engine current,
   a second control circuit coupled to an output of the comparison circuit for deriving a control signal for alternately switching the first and second switching devices so as to feed an alternating supply current to a connected engine in a manner so as to provide optimum power to a connected engine.

7. A power control circuit as claimed in claim 6, wherein the first control circuit comprises a microprocessor and the second control circuit comprises a pulse width modulator.

8. A power control circuit as claimed in claim 6, wherein said supply current measuring means comprise first and second current sensors connected in separate arms of the bridge circuit and an adder type circuit controlled by said first and second current sensors.

9. A power control circuit as claimed in claim 8, wherein said adder type circuit supplies said signal to the first control circuit via a low pass filter.

10. A power control circuit as claimed in claim 6, wherein said supply current measuring means comprise first and second current sensors connected in separate arms of the bridge circuit and an adder type circuit controlled by said first and second current sensors, and said measuring means further comprises a differential amplifier controlled by said first and second current sensors to supply said further signal to the second input of the comparison circuit.

11. A power control circuit as claimed in claim 6, wherein said bridge circuit further comprises third and fourth controlled switching devices and said first, second, third and fourth switching devices are connected in first, second, third and fourth arms of said bridge circuit, respectively.

* * * * *